United States Patent Office 2,998,734
Patented Sept. 5, 1961

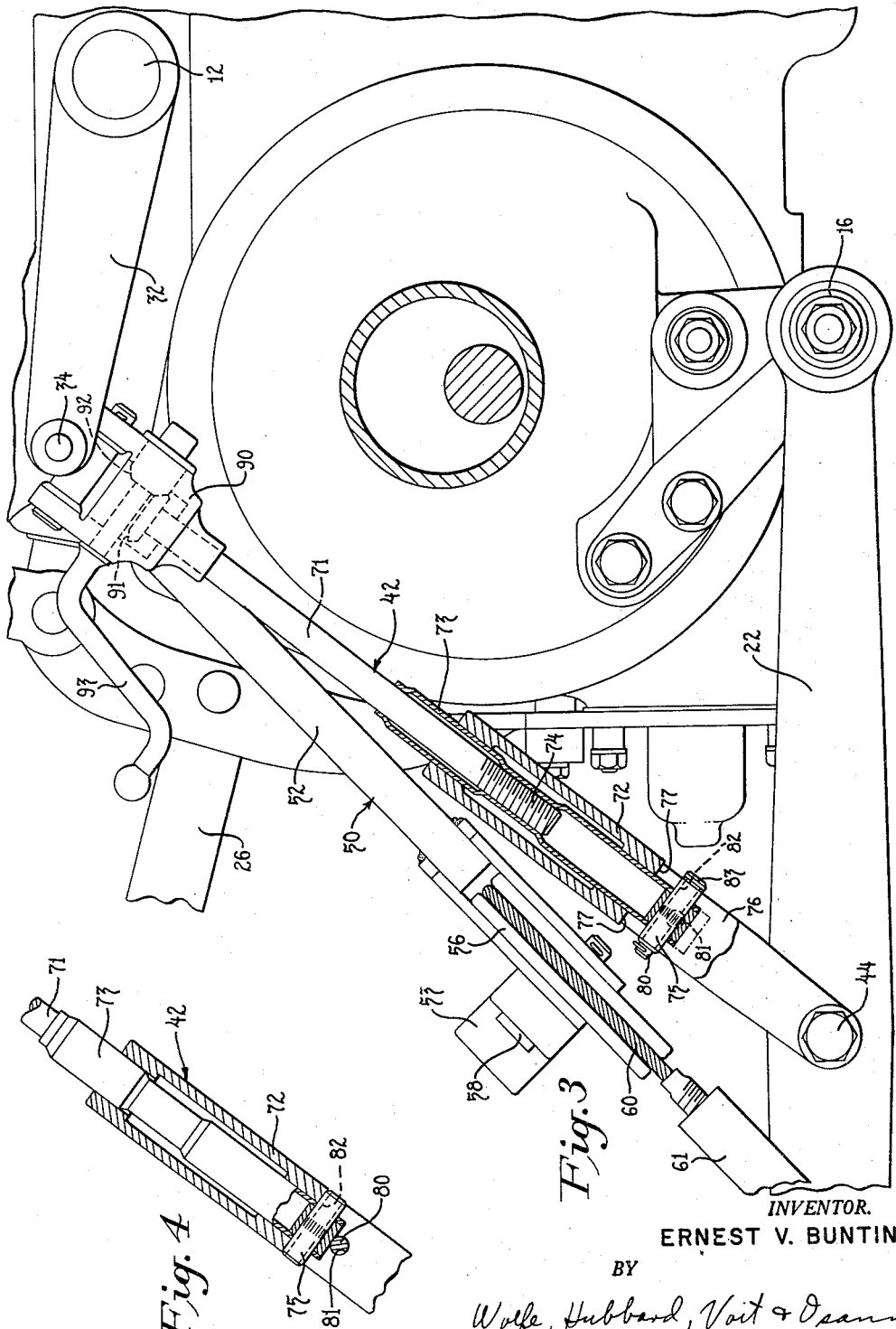

2,998,734
TRACTOR DRAFT LINKAGE
Ernest V. Bunting, Detroit, Mich., assignor to Massey-Ferguson Inc., Racine, Wis., a corporation of Maryland
Filed Apr. 16, 1959, Ser. No. 806,867
1 Claim. (Cl. 74—579)

The present invention relates to tractor draft linkage and more particularly to linkage for use with wide implements.

As is well known to those skilled in the art, the so-called Ferguson-type linkage employs a pair of rearwardly extending draft links which are suspended by separate drop links for raising and lowering by the power lift device on the tractor. Ground reaction is transmitted to the power lift device by a top link which sets the operating level of the draft links to keep the implement at a certain level in the ground. However, certain types of tractor mounted implements are substantially wider than the tractor, for example, field cultivators and listers; proper operation of such wide implements requires that they be permitted to follow the ground contour and remain parallel to the ground independently of the position of the tractor. In order to permit the implement to cant in one direction or the other relative to the tractor while maintaining the implement weight supported by the tractor, it is desirable to provide a cable suspension for the draft links, in lieu of the rigid drop links, with the draft links being interconnected so that each is free to come and go through a small range while maintaining the implement at the same average elevation. A cable suspension scheme for accomplishing the above is shown in the Todd applications for patents 615,512 and 616,457, now Patent No. 2,915,130, both filed October 17, 1956. However, due to the necessity for disabling the rigid drop links when the cable suspension means is employed, prior devices have found it necessary to employ auxiliary linkage such as lift arms having a floating pivot and with special throw-off means for locking and releasing the pivot.

Accordingly, it is an object of the present invention to provide a tractor hitch mechanism which includes both cable suspension for wide implements and rigid drop link suspension for conventional implements, with improved means for disabling the drop links when employing the cable suspension. It is a related object to provide a drop link disabling means which is readily changed from one mode of operation to the other simply by inserting or retracting a pin element, and which, in its locked-up position, is mechanically strong for the handling of high draft implements of conventional design.

It is a more specific object to provide a drop link abling and disabling means which is extremely simple, giving the rear end of the tractor a clean and uncluttered look. In one of its aspects it is an object of the present invention to provide an arrangement in which the tractor lift arms may be pinned directly to the drop links and cable suspension links on a common pivot axis and without the multiplicity of parts and pivot points which has characterized conventional arrangements capable of both modes of operation.

As a further object of the present invention a drop link is provided capable of being locked by inserting a single locking pin with novel position for storing and protecting the pin when not in use, thereby preventing possible loss when the tractor is out in the field.

It is a still further object to provide a novel drop link construction which is economical, which may be employed as standard equipment in tractors whether or not the tractors are intended for use with a cable suspension linkage, and which permits such linkage to be added later, if desired, without necessity for securing a new set of drop links.

Other objects and advantages of the invention will become apparent upon reading the attached detailed description and upon reference to the drawings in which:

FIG. 3 is a fragmentary sectional side view showing the improved hitch linkage in greater detail.

FIG. 4 is a fragment showing one of the drop links in the rigid or locked condition.

While the invention has been described in connection with a preferred embodiment, it will be understood that I do not intend to be limited to any specific embodiment but intend to cover all equivalent and alternative constructions which may be included within the spirit and scope of the appended claims.

Figure 1:
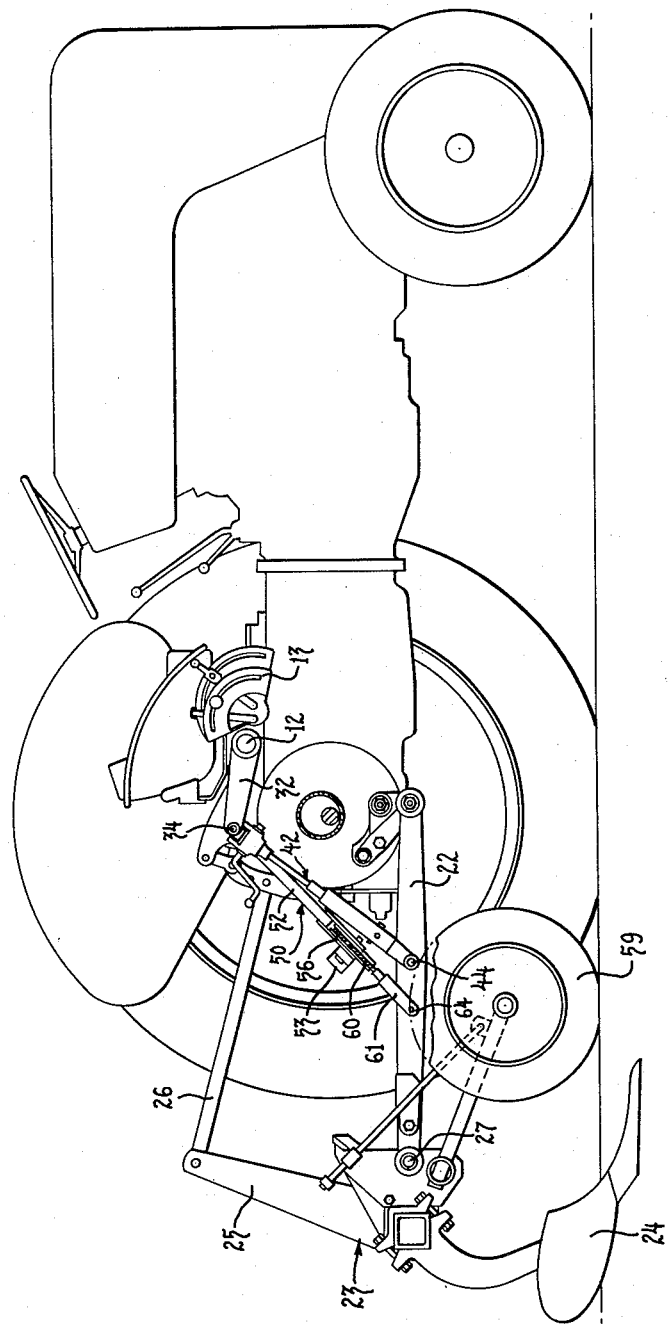
FIGURE 1 is a side view of a tractor, tractor hitch and attached implement with portions being shown in simplified outline.

Turning now to the drawings, FIG. 1 is a general view of a tractor of well known type having a built-in power lift mechanism (not shown) which serves to position a lift shaft 12 in response to an automatic draft control mechanism and under the control of quadrant levers 13. Trailingly pivoted at the underside of the tractor rear axle housing on pivots 15, 16 (FIG. 2) are draft links 21, 22. Secured to the rear ends of the draft links is an implement generally indicated at 23 which may be of the type shown in greater detail in Todd application 616,457 mentioned above. It will suffice to say that the implement includes a ground engaging member 24 and an upstanding post 25 which is coupled to the tractor draft control mechanism through a top link 26. The implement pivots on the draft links about an axis 27.

For the purpose of supporting the lower draft links 21, 22, a pair of lift arms 31, 32 are provided which are secured to the ends of the shaft 12. Pinned to the upper ends of the lift arms 31, 32 at pivots 33, 34 respectively are drop links 41, 42. The latter are pinned at their lower ends to the draft links at pivots 43, 44 respectively.

In the normal operation of the system and with the drop links 41, 42, assumed to be rigid, ground reaction causes the implement to tend to rock about the draft link pivot axis 27 so that compressive force is applied to the coupling 26, actuating the draft control mechanism to correctively raise or lower the trailing draft links and thereby to adjust the height of the implement in the ground. In the case of wide implements such as a lister or cultivator it is desirable for the implement to be able to cant slightly in one direction or the other in order to follow the ground contour while the weight of the implement is, nevertheless, supported by the tractor.

Figure 2:
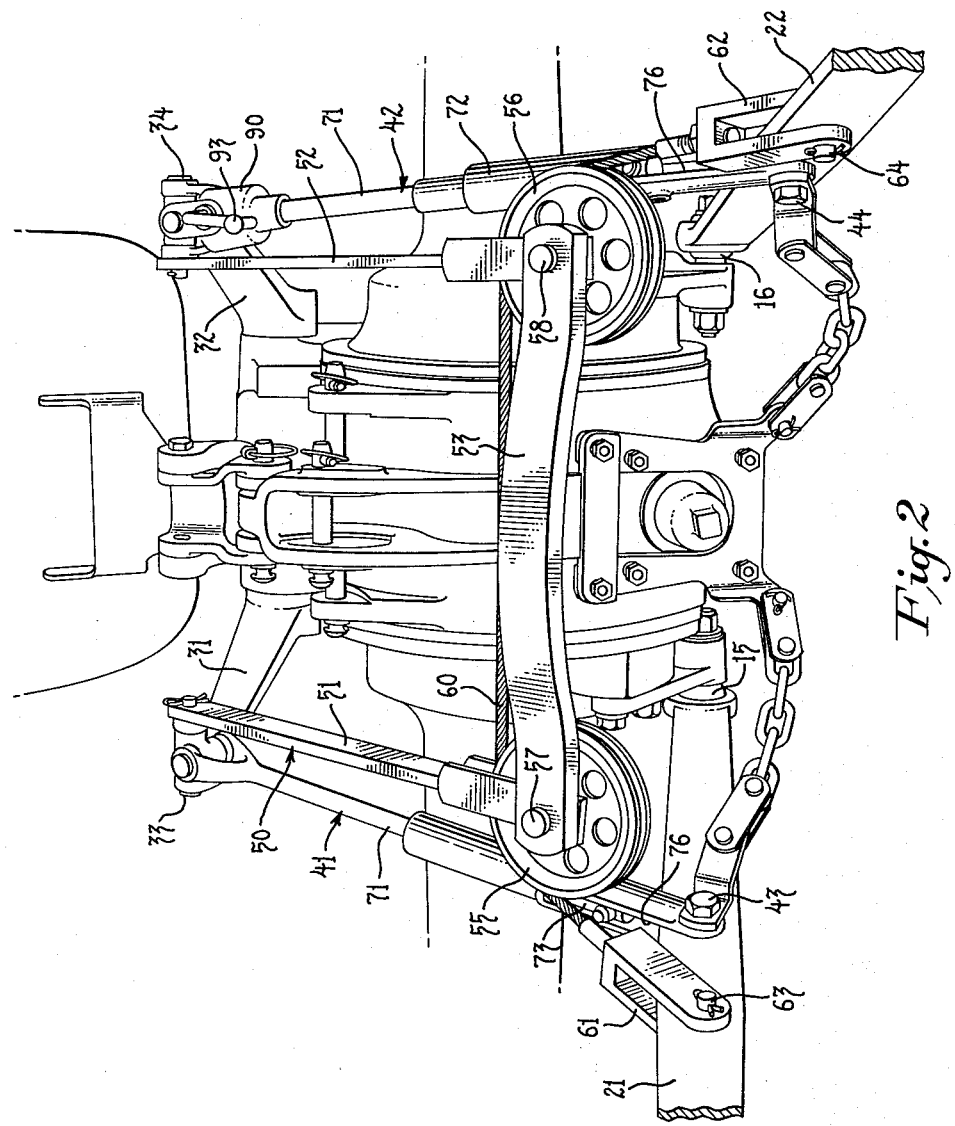
FIG. 2 is a fragmentary perspective of the rear end of the tractor and the associated hitch linkage shown in FIG. 1.

Thus in accordance with the present invention an auxiliary flexible supporting means is provided to permit differential movement of the draft links, and novel disabling means are incorporated in the drop links 41, 42 to permit such links to be collapsible while the auxiliary supporting means is in operation, yet capable of being positively locked or rigidified when conventional implements are connected to the ends of the draft links. Prior to discussing the structural features of the drop links, mention may first be made of the auxiliary supporting arrangement which, in the present instance, includes a cable and pair of pulleys. Specifically, the supporting arrangement 50 includes a pair of cable supporting links 51, 52 which are interconnected at their lower ends by a cross member 53, the members 51—53 together forming a U-shaped cable support. As shown in FIG. 2 the upper ends of the cable supporting links 51, 52 are pivoted to the same pivots 33, 34 which support the tractor drop links. Mounted at the ends of the cross member 53 are pulleys 55, 56 rotatable on pivots 57, 58. Trained about the pulleys 55, 56 is a supporting cable 60 having clevises 61, 62 at its ends for coupling to the tractor draft links.

It will thus be apparent that when the tractor draft links 41, 42 are put in their collapsible condition, as will be discussed in further detail, the draft links 21, 22 are free to move upwardly and downwardly with respect to one another through a limited range, with upward movement of one being exactly compensated by downward movement of the other. Thus the rear ends of the draft links and the connected implement, for a given setting of the power lift mechanism, are maintained at a constant average height, and the implement is tractor-supported while nevertheless free to cant in one direction or the other. Ground wheels 59, which are preferably provided at each side of the implement lightly contact the ground to determine the attitude of the implement.

In carrying out the present invention, the drop links are formed of two portions which telescope together freely when the cable supporting means is being used but which have novel provision for pinning together for rigidity when operating a conventional implement such as a plow. Taking the drop link 42 by way of example, reference is made to FIG. 3 for the details of construction. Here it will be noted that the drop links 42 consists of a central rod portion 71 and a hollow cylindrical portion 72. Forming an extension of the rod portion 71 and slidable in the portion 72 is a sleeve 73, the members being threaded together as indicated at 74. Because of the telescoping, the drop link is free to elongate or shorten as the connected draft link 22 moves through a limited range.

In order to bottom the two telescoping portions together in the elongating direction, the inner member 73 is provided with a transverse pin 75 and the cylindrical portion 72 is slotted at 76 to provide clearance for back and forth movement of the pin. At the root of the slot 76 are abutments 77 which are in the path of movement of the pin. Thus when the link achieves a predetermined length, bottoming occurs and the drop link then becomes capable of supporting a load in tension.

In practice the cable is made "short" so that the pins 75 in the respective drop links are spaced from the abutments by a distance of several inches when the implement is cable-supported. This insures that each drop link is free to "come and go" through the desired range without premature bottoming.

In accordance with one of the aspects of the invention a removable locking member in the form of a pin is insertable into the cylindrical portion of the draft link and spanning the slot 76 for maintaining the inner and outer members bottomed together in compression as well as tension thereby to rigidify the link. As shown in FIG. 4 the pin, indicated at 80, is fitted into registering holes 81; with the pin in place it is apparent that there is no possibility of relative movement between the members 71, 72 in either direction. Moreover, due to the telescopic overlapping, the drop link is stiff in any longitudinal plane. The pin 80 may be of relatively small size since the drop links are stressed primarily in tension.

To insert the pin 80, the cable 60 is first disconnected at one end. The lift arms are then raised, tensioning the drop links, which bottoms the telescoping parts and clears the alined holes 81, permitting the pin to be slipped into position by the fingers. A tight fit may be used if desired, since the holes 81, being bottomless, cause the end of the pin to be accessible for tapping when removal is later required.

As a further feature of the invention, novel means are provided for storing the locking pin 80 when the same is removed from active position. Specifically, the transverse pin 75 is formed as a sleeve for this purpose, being of hollow construction with a bore 82 just slightly greater than the pin diameter. FIG. 3 illustrates the pin 80 stored in an out-of-the-way, protected position inside of the pin 75. To prevent the pin from slipping through the bore it is provided with an enlarged head as indicated at 83. And since the positions of use and storage are close together, a short chain may be used to anchor the pin to the body of the drop link.

Under field conditions it is a simple matter for the farmer to switch from one mode of operation to the other. When a standard implement is to be used, the pins are simply removed from the novel storage receptacle and inserted in place. The operator has no need to search his pockets. When it is desired to use a wide implement, the lift arms are raised, which removes pressure from the pins 80, enabling them to be easily extracted. The cable is then re-connected.

In the case of the drop link 42 illustrated in FIG. 3 a conventional leveling means is provided at the upper end of the link. This leveling means includes a housing 90 having a pair of beveled gears 91, 92 operated manually by a crank 93. Turning the crank rotates the rod so it is screwed or unscrewed with respect to the sleeve 73 and changing its effective length. In the case of the drop link 41 which need not be adjustable, the housing 90 and special rotating means may simply be omitted; for example, the parts 71, 73 may be made integral. Bottoming and lock-up are exactly the same as described in connection with the link 42.

Comparing the present arrangement with prior art arrangements exemplified by the above mentioned Todd patent applications, the simplicity and effectiveness of the present device become apparent. It may be noted that auxiliary links for supporting the drop links, and locking means therefor, have been completely dispensed with and the drop links are connected directly to the outer ends of the lift arms. The tractor rear axle housing is less cluttered with mechanism and a neater appearance is the result. If desired, new tractors may be equipped with the improved drop links which are maintained locked by the pins 80 until such time as a cable supporting means is required. It is to be noted, moreover, that the cable supporting means is secured to the same pivots 33, 34, as are employed for the drop links. Thus, addition of the cable supporting means becomes an extremely simple matter: The upper ends of the supporting links 51, 52 are simply slipped over the pivots 33, 34 and maintained thereon by suitable cotter keys. The clevis ends of the cable 60 are pinned in place by inserting pins at 63, 64. This completes the installation, and to make the cable supporting means effective, the locking pins 80 are slipped out of the drop links as described.

Once installed, the cable supporting means need not be removed and both of the alternative forms of support are thereafter available to the tractor operator. Since the links 41, 51 and the links 42, 52 lie closely side by side, little additional space is required and the cable supporting means does not interfere with normal operation of the tractor. Moreover, because of the spread apart, U-shaped construction, the pivots and the mechanism, including the rocker arm for the draft control mechanism, are all freely accessible at the top of the tractor rear end housing.

What is claimed is:

A drop link for coupling the power lift mechanism of a tractor to a trailing draft link comprising, in combination, a hollow cylindrical member having a clevis portion at one end defining a transverse slot with a closed end, pivot establishing means at the outer end of said clevis portion for pivotally coupling said member to an element disposed within the end of said slot, a rod member slidably received within the hollow portion of said cylindrical member, said rod member having one end projecting into said slot and means at the other end for pivotally coupling said rod member to an element, a sleeve secured transversely through said one end of the rod member so as to fit closely and slidably within said slot, said sleeve thus preventing relative rotation between said cylindrical member and said rod member and also preventing withdrawal of said one end of the rod member from said hollow cylindrical member by abutting said end of the slot, a stop pin removably secured through apertures secured in said clevis portion so that the pin passes through said slot to block movement of said rod member from the position wherein said sleeve abuts said end of the slot, and said pin being slightly smaller than the internal dimension of said sleeve so that upon removal of the pin from said apertures it may be stored within said sleeve.

References Cited in the file of this patent

UNITED STATES PATENTS

| | | |
|---|---|---|
| 519,458 | Shepard | May 8, 1894 |
| 2,363,292 | Brown | Nov. 21, 1944 |
| 2,541,964 | Hennings | Feb. 13, 1951 |
| 2,704,018 | Oehler et al. | Mar. 15, 1955 |
| 2,737,735 | Westfall | Mar. 13, 1956 |
| 2,756,655 | Kincaide | July 31, 1956 |

FOREIGN PATENTS

| | | |
|---|---|---|
| 505,837 | Belgium | Sept. 29, 1951 |